United States Patent
Penna (10) Patent No.: US 6,243,488 B1
(45) Date of Patent: Jun. 5, 2001

(54) METHOD AND APPARATUS FOR RENDERING A TWO DIMENSIONAL IMAGE FROM THREE DIMENSIONAL IMAGE DATA

(75) Inventor: David E. Penna, Redhill (GB)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 08/760,123

(22) Filed: Dec. 3, 1996

Related U.S. Application Data (63) Continuation of application No. 08/285,838, filed on Aug. 4, 1994, now abandoned.

(30) Foreign Application Priority Data

Aug. 5, 1993 (GB) .................................................. 9316214

(51) Int. Cl.⁷ ............................... G06K 9/00; G06K 9/36
(52) U.S. Cl. .......................... 382/154; 382/285; 395/125
(58) Field of Search .................................... 382/154, 285; 395/119, 125, 122, 124; 356/12; 345/139

(56) References Cited

U.S. PATENT DOCUMENTS

| | | | |
|---|---|---|---|
| 4,661,986 | * 4/1987 | Adelson ................................ | 382/154 |
| 4,812,988 | * 3/1989 | Duthuit et al. ....................... | 395/125 |
| 4,817,005 | * 3/1989 | Kubota et al. ........................ | 395/125 |
| 4,858,149 | * 8/1989 | Quarendon ........................... | 395/125 |
| 4,882,683 | * 11/1989 | Rupp et al. ........................... | 395/165 |
| 5,056,045 | * 10/1991 | Ohsawa ................................ | 395/141 |
| 5,107,444 | * 4/1992 | Wu ....................................... | 395/125 |
| 5,175,806 | 12/1992 | Muskovitz et al. .................. | 395/125 |
| 5,222,896 | * 6/1993 | Smith, Jr. ............................. | 434/135 |
| 5,245,700 | * 9/1993 | Fossum ................................ | 395/125 |
| 5,454,068 | * 9/1995 | Ramanujam ......................... | 395/119 |
| 5,537,228 | * 7/1996 | Dillinger ............................. | 358/502 |
| 5,544,292 | * 8/1996 | Wilsner ................................ | 395/130 |
| 5,579,454 | * 11/1996 | Billyard et al. ...................... | 395/121 |
| 5,614,961 | * 3/1997 | Gibeau et al. ....................... | 348/750 |
| 5,659,671 | * 8/1997 | Tannenbaum et al. .............. | 395/126 |

OTHER PUBLICATIONS

"Survey of Texture Mapping", by P.S. Heckbert, IEEE Computer Graphics and Applications, Nov. 6, 1986, No. 11, pp. 56–67.

* cited by examiner

Primary Examiner—Yon Couso
Assistant Examiner—Jayanit K. Patel
(74) Attorney, Agent, or Firm—Brian Wieghaus (57) ABSTRACT

Texture mapping or video mapping is performed in such a way as to obtain perspectively correct images, while at the same time not requiring excessive computational overheads. Non-linear functions required to achieve perspectively correct images are stored in the form of look-up tables. Depth extents at the extremes of a locus of interpolation are compared and from this comparison a particular look-up table, or a pair of look-up tables, are selected. When a pair of look-up tables are selected, it is possible to linearly interpolate between the two, in order to obtain a closer approximation to the desired non-linear response.

26 Claims, 4 Drawing Sheets

FIG.6

METHOD AND APPARATUS FOR RENDERING A TWO DIMENSIONAL IMAGE FROM THREE DIMENSIONAL IMAGE DATA

This is a continuation of application Ser. No. 08/285,838, filed Aug. 4, 1994 now abandoned.

BACKGROUND OF THE INVENTION

The present invention relates to a method of image processing and an image processing apparatus.

In particular, the present invention relates to rendering a two dimensional image from three dimensional image data, wherein a polygon defined in three dimensional space is projected into two dimensional space and pixel values from a two dimensional image are mapped onto pixel positions within said projected two dimensional polygon.

Computer graphics systems are known in which two dimensional video images or two dimensional textures appear wrapped around a solid three dimensional object. A three dimensional object is represented as three dimensional image data, in which the vertices of polyhedra are defined as three dimensional co-ordinate locations within a virtual three dimensional world, commonly referred to as world-space. The object is viewed by producing a two dimensional projection from the three dimensional data, so as to produce a still two-dimensional image, or a sequence of images, which may be recorded onto the photographic film or a video carrying medium.

The position of objects, along with viewing position and orientation, may be adjusted within the three dimensional world-space, resulting in a sequence of projections being calculated. These projections may be calculated on a frame-by-frame basis, possibly in real time, thereby facilitating the creation of a virtual interactive environment.

In order to effect the rendering of three dimensional objects, each surface of a polyhedron may be considered individually, thereby reducing the object to a net of polygons. Thus, it is possible to project the object on a polygon-by-polygon basis and to calculate lighting values for each polygon, so that displayable pixel values may be determined for the pixel positions which lie within the projected polygon boundaries.

In addition to identifying solid colours for each polygon surface, it is also possible to map an existing video frame onto the polygon surfaces, so that it appears as if a flat two dimensional image has been wrapped around the three dimensional object. The video frame may consist of a single image, thereby creating the effect of a texture being mapped onto the three dimensional object. Alternatively, the video image may consist of a video sequence, thereby creating the effect of a moving video image being wrapped around the solid object.

In the three dimensional world-space, polygons have orientations in the x, y and the z dimensions. However, once projected onto a two dimensional plane, the polygons are defined with only two dimensions which, in order to distinguish these from the x, y and z dimensions of the three dimensional world, will be identified herein as X and Y dimensions. Thus, within a video frame, lines are scanned from the top left corner, in which traversing across a line is achieved by increasing values of X and advancing to the next line is achieved by increasing values of Y.

In order to create the illusion of a three dimensional object being viewed, it is necessary to take account of perspective, when projecting the three dimensional polygons onto the two dimensional plane. This is a non-linear process and, consequently, computationally demanding. It is therefore preferable to project the vertices of the three dimensional polygons onto positions within the two dimensional plane and thereafter perform further operations, such as shading and rendering, on the two dimensional polygons, such that it is only necessary to perform calculations with respect to two dimensions, rather than three.

It is also conventional to perform manipulations on the two dimensional polygon by processes of linear interpolation. Thus, in preference to allocating a single colour to each polygon surface, thereby resulting in a clear identification of the polygon boundaries, it is possible to perform Gouraud shading on the polygons by identifying a polygon colour for each of the vertices. Thereafter, pixel positions along the edges of the polygon are calculated by linearly interpolating along said edges and pixel values within the polygon are allocated values by linearly interpolating across the horizontal scan-line.

Although this process works adequately well when performing solid shading on an object, it has a major disadvantage when performing texture or video mapping.

As previously stated, the purpose of performing texture mapping or video mapping is to create the illusion of a texture or video image being wrapped around a solid three dimensional object. Thus, the desired result will be achieved if the calculations are performed in the three dimensional world-space. However, as previously stated, this is computationally demanding and would not, therefore, be realised in most practical embodiments. However, performing the mapping operation on the two dimensional polygon by a process of linear interpolation fails to take account of the non-linear nature of the perspective, resulting in incorrectly calculated values and clear errors in the final output image.

SUMMARY OF THE INVENTION

According to a first aspect of the present invention, there is provided an image processing method for rendering a two dimensional image from three dimensional image data, wherein a polygon defined in three dimensional space is projected into two dimensional space and pixel values from a two dimensional image are mapped onto pixels within said projected two dimensional polygon, characterised in that: positions within said two dimensional images are identified along a locus to be interpolated by addressing values from a look-up table to obtain a substantially perspectively correct mapping.

Thus, the present invention allows mapping values to be calculated, initially, by a process of linear interpolation. The values calculated by this method may then be perspectively corrected by addressing the look-up table.

According to a second aspect of the invention, there is provided an image processing apparatus arranged to render a two dimensional image from three dimensional image data, such that a polygon defined in three dimensional space is projected into two dimensional space and pixel values from a two dimensional image are mapped onto pixels within the projected polygon, characterised by: storage means arranged to store look up tables of values defining perspective-correcting functions, and processing means arranged to interpolate a locus of positions within the input image by addressing values from a look up table so as to perspectively correct the interpolated positions.

Thus, the present invention provides an advantage of allowing perspectively correct video and texture mapping, but with minimal additional computational requirements.

BRIEF DESCRIPTION OF THE DRAWINGS

The invention will now be described by way of example only, with reference to the accompanying drawings, in which.

DETAILED DESCRIPTION OF PREFERRED EMBODIMENTS OF THE INVENTION

Figure 1:
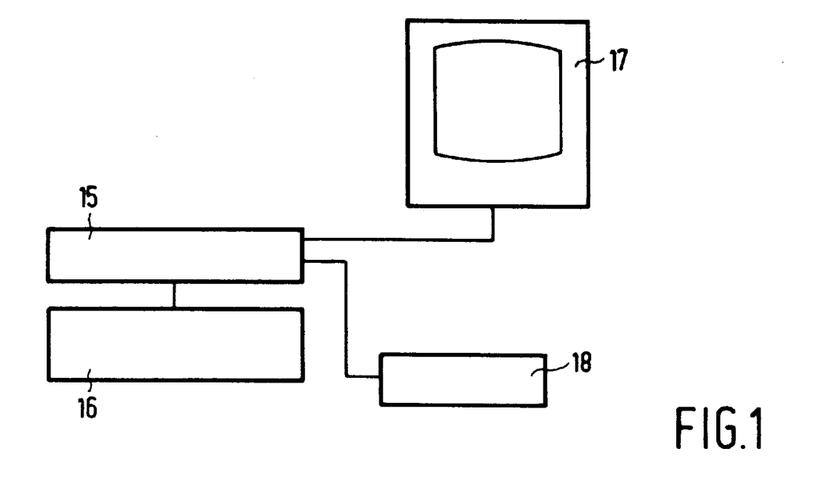
FIG. 1 shows an image processing apparatus, including a processor having circuitry for effecting two dimensional texture mapping.

An image processing apparatus is shown in FIG. 1, having a processing unit 15, arranged to process three dimensional image data to produce a viewable two dimensional view of a virtual three dimensional world. Three dimensional data and instructions controlling the operation of the processor 15, are stored via a permanent storage device 16, which may include a magnetic disc, an optical disc, a magneto-optical disc or other suitable storage medium. For example, the data could be stored on a conventional audio-type compact disc (CD-ROM) or any other medium capable of supplying data to the processor 15 at the required rate.

Video images are supplied to a video monitor 17, which could be in the form of a conventional television receiver. Furthermore, interactive inputs are received from a controller 18, which could take the form of a keyboard, tracker-ball, mouse or dedicated key-pad, etc.

Three dimensional data is stored by defining the position of polyhedra vertices in a three dimensional co-ordinate space. A two dimensional view of the three dimensional data is produced, on a frame-by-frame basis, by considering the vertices as being connected by straight lines, thereby defining a net of flat polygons. A view is rendered by considering each polygon in turn, possibly after performing back face culling, etc so as to remove polygons which are not visible from the particular view under consideration. Thereafter, a list of polygons may be defined, which ensures that the polygons are rendered in the correct order.

It is possible to allocate a solid colour to each of the polygons or, alternatively, to identify colours for the vertices and thereafter allocate colour values for each pixel within the polygon boundary by a process of linear interpolation. A similar process may also be performed to effect texture mapping or video mapping, the nature of which is illustrated with reference to FIG. 2.

Figure 2A:
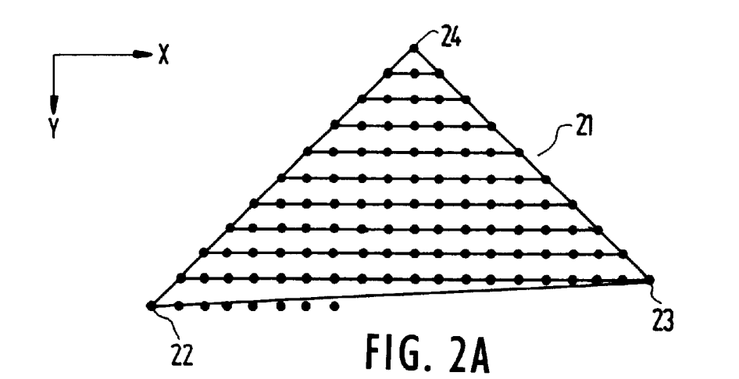
FIG. 2 shows a two dimensional polygon having a texture mapped thereon.
Figure 2B:
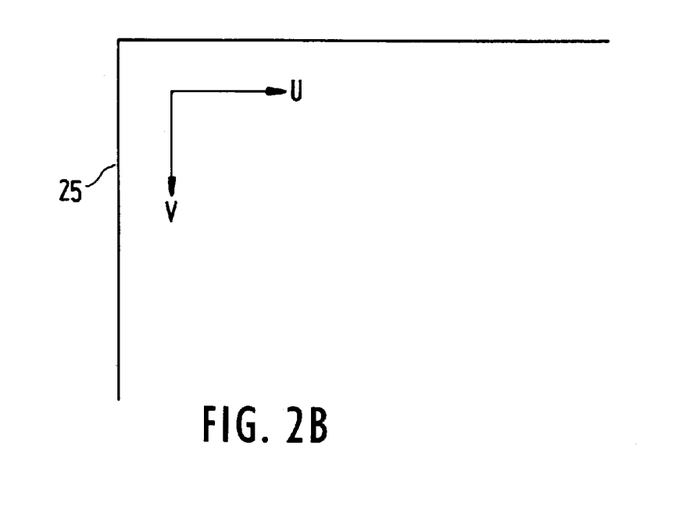
Figure 3A:
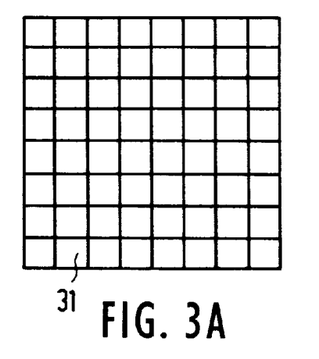
FIG. 3 shows the effect of a linear mapping and a perspectively correct mapping.
Figure 3B:
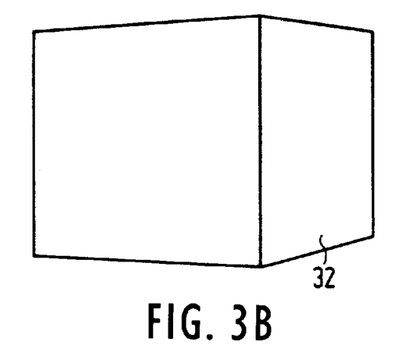
Figure 3C:
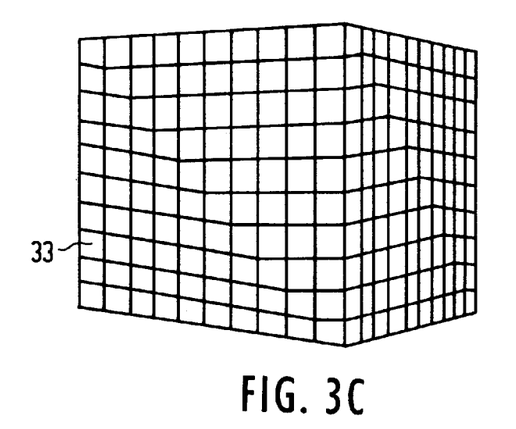
Figure 3D:
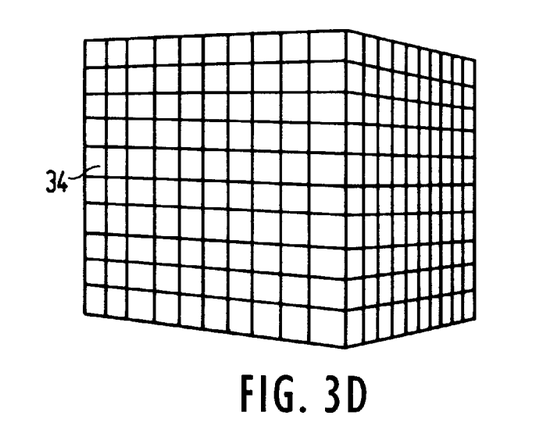

In FIG. 2, a polygon 21 has been projected into a two dimensional viewing plane by processing three dimensional co-ordinates for vertices 22, 23 and 24. Thus, these vertices were previously defined in a three dimensional space, having x, y and z co-ordinates and are projected onto a two dimensional (X,Y) plane.

The conveyance of information obtained from the z dimension to an observer is achieved by ensuring that the polygons are rendered in the correct order, that is to say, polygons towards the rear (having greatest z extent) are rendered before polygons which have lower values of z, thereby ensuring that the polygons closest to an observer occlude polygons which are further away from the observer. Furthermore, information derived from the z dimension is also retained by ensuring perspectively correct projection of the polygons onto the two dimensional plane.

After projection, vertices 22, 23 and 24 are positioned at perspectively correct locations within the two dimensional image-frame. Each vertex contains co-ordinate locations reflecting a mapping from the three dimensional world space to the two dimensional image plane, in the form of a three dimensional co-ordinate set and a two dimensional co-ordinate set. In addition, each vertex may also contain other information, such as that defining aspects of the surface of the polygon, such as its colour, opacity or specularity, etc.

In the present embodiment, the processor is concerned with mapping a two dimensional image frame onto a three dimensional object, wherein said object is defined in the three dimensional world-space. Part of a two dimensional object is identified as reference 25 in FIG. 2. The two dimensional image is a conventional video frame, to provide a mapping of a video texture onto the three dimensional object. Alternatively, a sequence of video frames may be considered, resulting in the mapping of a moving video sequence onto the three dimensional object. Thus, the video frame consists of an array of multi-coloured pixels, which may be defined as RGB values, luminance plus colour difference values or a compressed representation of such values. The position of each pixel within the image frame is identified by measuring along a scan-line from the top left corner, in order to give a U co-ordinate and measuring the number of scan lines down the frame, resulting in a V co-ordinate. Thus, it should be emphasised that the notation U and V is used herein to identify co-ordinate locations within the originating image and should not be confused with colour difference signals used in the PAL system.

Returning to the polygon 21, said polygon may be considered as an area of an output image and the purpose of the texture mapping procedure is to identify pixel values for said area. Thus, the image frame may be built up in a storage device and once completely full, that is to say, once pixel values have been calculated for all of the pixels within the frame, said frame may be raster scanned in order to produce an viewable video signal.

Vertices 22, 23 and 24 were originally defined in three dimensional space, each having a coordinate position (x,y,z). The projection into the two dimensional plane results in each vertex having a two dimensional coordinate within the viewing plane (X, Y). Thus, the vertices 22, 23 and 24 define an area of pixels within the output video frame, bounded by triangular polygon 21.

In theory, it would be possible to consider each pixel within triangle 21 in the three dimensional world space. Thus, the input two dimensional image 25 could be mapped into the three dimensional world space, pixel values could be calculated within said space, whereafter said pixels could be projected into the two dimensional viewing plane. However, such a procedure would be computationally expensive and it would not allow the texture mapping facility to be implemented on many practical platforms.

As previously stated, it is known to effect types of shading by considering each of the vertices 22, 23, 24 and interpolating therebetween. Thus, a similar procedure may be adopted for effecting texture mapping, in that a mapping is defined for each of the vertices, whereafter mappings for each of the pixels bounded by the polygon are calculated by interpolating between the information which is available.

The process may be initiated by identifying the vertices having the lowest value of Y which, in this example, would be vertex 24. Thus, rendering, from top to bottom on a line-by-line basis, would be initiated from vertex 24.

A mapping is defined for vertex 24 which identifies a particular pixel location within the input image frame 25. Thus, in addition to an (X,Y) position being defined for a vertex 24, a (U,V) co-ordinate is also defined for this vertex. Thus, a pixel within the output image frame is defined at position (X,Y) of vertex 24, having colour values obtained by mapping a pixel from the input image frame 25 from position (U,V) in the input frame. Similarly, a pixel value at vertex 22 is defined by a (U,V) coordinate mapping into the input image frame, along with a (U,V) co-ordinate within the input frame for vertex 23.

For a triangular polygon 21 to be rendered, it is apparent that a triangular region of pixels within the input image frame 25 will be mapped onto the pixels within polygon 21. In known systems, pixel values, defined by (U,V) co-ordinates, are identified for all of the pixel locations (X,Y) within the polygon region by a process of linear interpolation. Thus, X and Y values for vertex 22 would be subtracted from the similar values for vertex 24. This difference would then be divided by the number of pixel spacings between vertex 24 and 22, resulting in gradient values which may be added successively from scan-line to scan-line, while traversing from vertex 24 to vertex 22. Similarly, a linear interpolation may be performed between vertex 24 and 23, whereafter further processes of linear interpolation may be performed across the scan-line, to produce U and v values for each pixel along each of the scan-lines.

Referring to FIG. 3, a two dimensional input image texture is illustrated at 31 and a representation of a three dimensional object, onto which the two dimensional image texture is to be mapped, is identified at 32.

As illustrated in FIG. 2, mapping and rendering are effected with reference to triangular polygons, therefore a first stage would consist of splitting the flat surfaces of object 32 into triangular renderable polygons and projecting the polygons onto a two dimensional plane. Thereafter, maps are defined for the polygon vertices and additional positions are interpolated, such that individual pixels within the polygons are identified by a direct two dimensional mapping from the input image to the output image.

The effect of using a conventional linearly interpolated mapping is illustrated by reference 33. As shown in this diagram, the mapped image is distorted and has been mapped with insufficient regard to the perspective. A perspectively correct mapping is illustrated by reference 34, in which it does appear that the originating image, illustrated at 31, has successfully been wrapped around the object illustrated at 32. However, it is not possible to achieve such a mapping using conventional techniques for linearly interpolating U and V values.

In the present embodiment, a mapping of pixel values from a two dimensional input image to an output two-dimensional frame is achieved by interpolation, however, said interpolation is performed with respect to a non-linear reference, thereby incorporating the non-linear effects (due to the non-linear projection) so as to correctly represent the perspective of the output image.

In the present embodiment, positions within the input two dimensional image, image 25 in FIG. 2, are identified along a locus to be interpolated, such as the locus of pixel positions along line 22 to 24 or the locus of pixel positions along individual scan-lines, by addressing values from a look-up table to obtain a substantially perspectively correct mapping.

The nature of the non-linear function will vary, depending upon the depth ratio of the two positions being interpolated. Thus, a plurality of functions are defined by the look-up table and a particular function is selected by making reference to this ratio.

Figure 4:
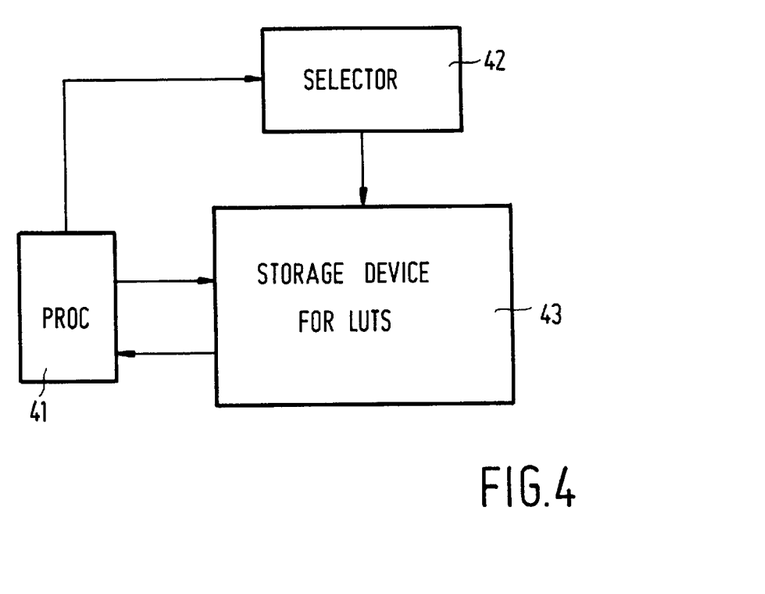
FIG. 4 details part of the processor shown in FIG. 1, including a plurality of look-up tables for storing mapping coefficients.

A circuit for performing perspectively correct interpolation is shown in FIG. 4. An interpolation is performed between a first pixel position in the output image frame to a second pixel position within said frame. For each of these pixel positions, defined by their X and Y coordinates, pixel values are also identified in the input image frame, defined by U and V coordinate locations of said input image frame.

Between the two defined pixel positions in the output image frame, a plurality of pixel positions are present, for which interpolated values of U and V are required. In addition, the two defined X and Y locations in the output frame have associated z values, derived from the original three dimensional world space. This z information is also required in order to select a particular look-up table, which will provide the non-linear perspectively corrected response required.

Referring to FIG. 2, an interpolation between vertices 22 and 24 may be considered, as an example. Vertices 22 and 24 are both defined positionally within the output frame by (X,Y) coordinates. In addition, each position also has an associated (U,V) coordinate location identified therewith, identifying a pixel in the input image frame 25.

Position 24 is separated from position 22 by ten pixel spacings. Therefore, in order to identify the increments or gradients between adjacent pixels, it is necessary to divide the difference between the values for U and V at locations 22 and 24 by ten, that is, by the number of pixel spacings between them.

Thus, in order to perform an interpolation between positions 22 and 24, the (X,Y) coordinates, the original z position and the (U,V) coordinates are supplied to a processor 41, for each of said positions. The z value for each of the positions is supplied to a selector 42, arranged to select a particular look-up table to be used. After the selector 42 has processed these z values, a selection signal is supplied to a memory device 43, identifying a particular look-up table for the purpose of calculating the interpolation.

Thus selector 42 has now effectively determined the level of perspective and made a particular non-linearly programmed look up table available to processor 41. The processor 41 examines the (X,Y) coordinates for each of the vertices and calculates the pixel spacing. Thus, the vertices define a locus of pixel positions and, for each of these pixel positions, the processor 41 is required to identify a (U,V) coordinate in the input image frame, such that an input image pixel can be mapped onto the pixel position (X,Y) in the output frame. In accordance with the invention, this locus is interpolated by addressing values from the selected look up table to provide a substantially perspectively correct mapping.

Clearly, the range of possible U and V values within the locus may be very large, therefore it is necessary to scale the values before the look up table is addressed. The U and V values are considered sequentially and in substantially the same way. Considering the U values, a first vertex will have a particular U value and a second vertex, defining the other end of the locus, will (in the non-trivial case) have a different U value. To allow entry to the look up table, these values are scaled to values of zero and unity respectively and the scaling factor is retained to allow intermediate pixel positions to be scaled and to perform the reverse operation on values read from the look up table.

Thus, the scaled difference in U (or V) between the defined values, which will always be equal to unity, is divided by the number of pixel spacings between the extreme values. The result of this division identifies the scaled distance between pixels to be interpolated. This value also provides an entry address to the look up table for the first pixel to be interpolated. Thus, a value between zero and unity addresses the look up table and a similarly proportioned value is returned. This value is then de-scaled to provide a valid, but perspectively correct, U location within the input frame.

The scaled distance is now added to the previously calculated scaled value to provide a scaled value for the second pixel to be interpolated. Again, this value addresses the look up table to produce a modified version, which is de-scaled to provide a real U address for the next pixel. Thus, this process of adding the scaled distance to the previously scaled position, reading a value from the look up table and de-scaling continues until all of the positions along the locus have been interpolated. The procedure is then repeated for the V values, whereafter a pixel value can be read from the input frame for each interpolated co-ordinate pair.

Figure 5:
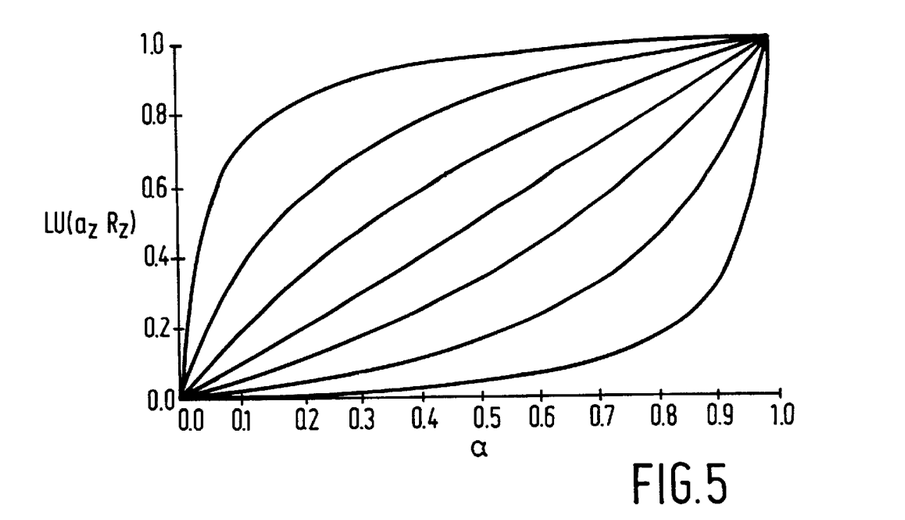
FIG. 5 illustrates non-linear functions defined by coefficients stored in look-up tables, of the type shown in FIG. 4.
Figure 6:
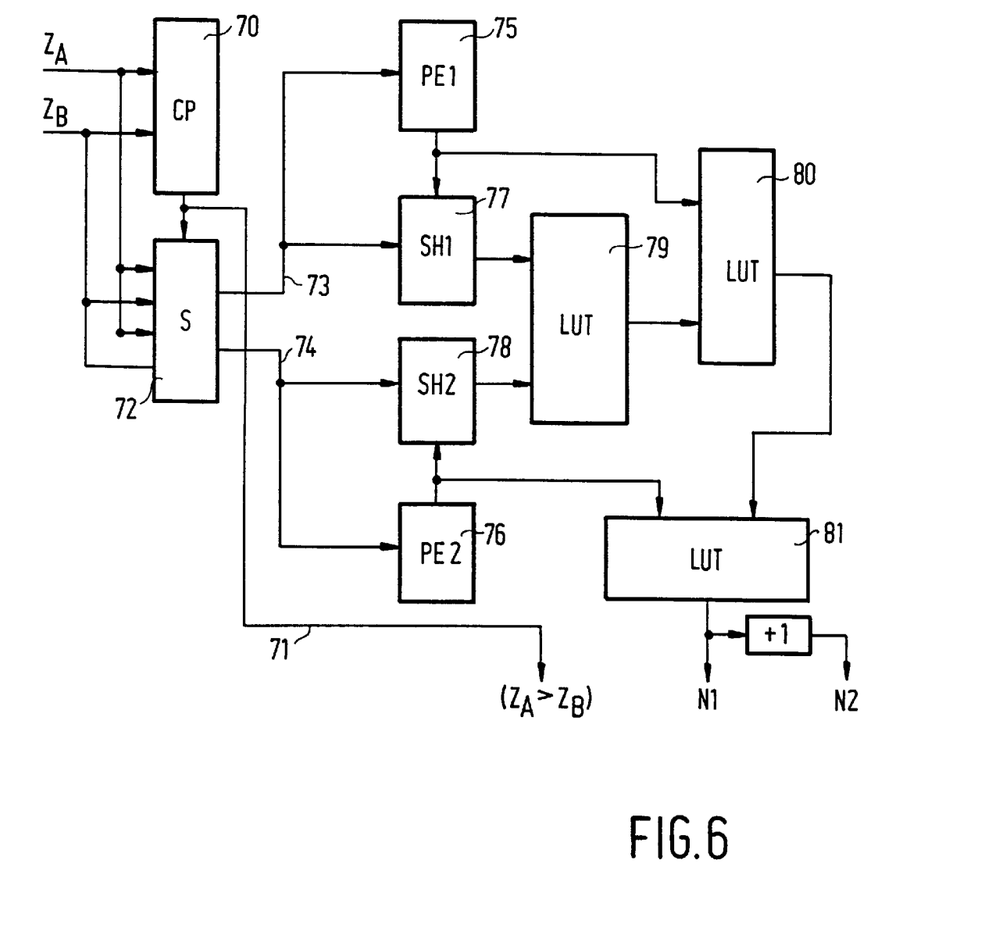
FIG. 6 details part of the processor shown in FIG. 1, for selecting a particular look-up table.

The selector 64 is detailed in FIG. 6. Firstly, it should be noted that the response curves identified in FIG. 5 are symmetrical, therefore a single response curve may be used for two positions, with a flag being set depending upon whether, as a vector moves from a first position to a second position it is backward facing or forward facing.

Selection is made by considering the z positions of the points being interpolated between. As the interpolation is effected, this z information has been lost, therefore, the z positions must be considered by referring back to the original three dimensional world-space. However, once the comparison has been made and a particular non-linear response selected, no further reference is required to the z dimension.

Interpolation is performed between a point A and a point B. The z distances for said points z(A) and z(B) are supplied to a comparator 70, which determines whether a point A is in front of point B or vice versa. As a result of this comparison, a flag indication is made on a line 71 if z(A) is greater than z(B). This information is supplied as part of the address to a look-up table 43, ensuring that the stored positions are addressed in the correct orientation, thereby taking advantage of the symmetrical redundancy.

The z(A) and z(B) values are also supplied to a selector 72 which, in response to the output from the comparator 71, ensures that the position having the largest z value is supplied on an output line 73, while the position having the smaller z value is supplied on an output line 74.

Outputs on said lines 73 and 74 are supplied to respective priority encoders 75, 76 and shift registers 77, 78.

The priority encoders identify the position of the most significant bit for the z value and, as a result of this determination, effect a number of shifts in their associated shift register, 77 or 78, such that the most significant bit is shifted to the left most side of the word.

The output from the priority encoders, indicating the number of shifts required, is therefore mathematically equivalent to the integer components of the log to the base 2 of the original number. The word read out from the shift registers 77 and 78 is truncated, possibly to three bits, and said three bit values represent the fractional part of the log to the base 2 of said distances.

These fractional parts are read from shift register 77 and 78 and supplied to a look-up table 79, which in turn provides a further output to a look-up table 80. Addressable lines to the look-up table 80 are increased by receiving the output from priority encoder 75 to produce an output which is supplied to a further look-up table 81. Similarly, the number of input address lines to look-up table 81 is increased by the output from priority encoder 76. Thus, look-up table 81 produces integer numbers identifying particular look-up tables within addressable device 43. Alternatively, device 43 may include sufficient memory for one particular look-up table and, in response to a selection made by selector 42 said look-up table may be programmed with a suitable function, of the type illustrated in FIG. 5.

The size of the look-up table 43 may be reduced by storing less than the required number of values for each particular function. Thereafter, specific values may be determined by a process of linear interpolation. As shown in FIG. 6, the output from look-up table 81 produces an integer value N and, in addition thereto, adds unity to the value N1 to produce an integer value N2, incremented by 1. In this way, it is possible to address two look-up tables within table 43 and, therefrom, to produce a modified response by interpolating two actual responses read from the table. In this way, the resolution of the system may be improved for a given number of functions stored within the table 43.

Thus, the use of a plurality of look-up tables allows non-linearities due to projection to be taken into account, while interpolating solely within the two dimensional images. Thus, acceptable perspective results are achieved without actually performing perspective calculations for each pixel and without forming a large number of computationally expensive operations.

From reading the present disclosure, other modifications will be apparent to persons skilled in the art. Such modifications may involve other features which are already known in the design, manufacture and use of image processing apparatus and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An image processing method for rendering a two dimensional output image comprised of pixels from three dimensional image data, wherein a random polyhedron is projected from a location of viewing as a two dimensional polygon having a boundary enclosing an area and defined in three dimensional space and pixel images from a two dimensional input image are mapped onto pixels within said projected two dimensional polygon, comprising the steps of:

provicing a plurality of look-up tables each with a set of perspective correction factors corresponding to a location of viewing;

identifying at least two boundary points on said boundary of said polygon;

mapping pixels within said two dimensional input image corresponding to each of said at least two points on said polygon boundary according to a defined mapping function;

identifying a locus of pixels within said polygon extending between said at least two boundary points; and mapping pixels within said two dimensional input image to each of said pixels of said locus of pixels within said polygon by (i) linearly interpolating at least one coordinate of each pixel along said locus of pixels to obtain an interpolated coordinate, (ii) identifying the look-up table corresponding to the location of viewing from which said two dimensional polygon was projected; (iii) applying a correction factor from the set of correction factors in the selected lookup table to the interpolated coordinate to obtain a corrected coordinate for the pixel to be mapped from the two dimensional input image.

2. A method according to claim 1, wherein a plurality of look-up tables are provided and a required look-up table is selected by processing depth values.

3. A method according to claim 2, wherein two look-up tables are selected and new values for performing the look-up operation are determined by a process of linear interpolation.

4. A method according to claim 2, wherein a first depth value associated with a first position is divided by a second depth value associated with a second position in order to produce a table selection value.

5. A method according to claim 4, wherein two look-up tables are selected and new values for performing the look-up operation are determined by a process of linear interpolation.

6. A method according to claim 2, wherein said depth values are processed by calculating the logarithm for each of said values.

7. A method according to claim 6, wherein two look-up tables are selected and new values for performing the look-up operation are determined by a process of linear interpolation.

8. A method according to claim 6, wherein said values are shifted and an indication of the number of shifts made are supplied to look-up table means to produce an indication of the look-up table to be selected for the mapping.

9. A method according to claim 8, wherein two look-up tables are selected and new values for performing the look-up operation are determined by a process of linear interpolation.

10. A method according to claim 1, wherein two look-up tables are selected and new values for performing the look-up operation are determined by a process of linear interpolation.

11. A method according to claim 1, wherein said mapping to said locus of pixels includes said steps of linearly interpolating, identifying, and applying a correction factor to each coordinate of each pixel of said locus of pixels.

12. A method according to claim 11, further comprising the steps of scaling the interpolated coordinate and applying the correction factor to the scaled interpolated coordinate, followed by descaling the corrected coordinate to obtain the coordinate for the pixel to be mapped from the two dimensional input image.

13. A method according to claim 12, wherein said boundary points are vertices of the two dimensional polygon.

14. Image processing apparatus arranged to render a two dimensional output image comprised of pixels from three dimensional image data, wherein a random polyhedron is projected from a location of viewing as a two dimensional polygon having a boundary enclosing an area and defined in three dimensional space and pixel values from a two dimensional input image are mapped onto pixels within the projected polygon, comprising:

processing means including means for identifying at least two boundary points on said boundary of said polygon, for mapping pixels within said two dimensional input image corresponding to each of said at least two points on said polygon boundary according to a defined mapping function, for identifying a locus of pixels within said polygon extending between said at least two boundary points, and for mapping pixels within said two dimensional input image to each of said pixels of said locus of pixels within said polygon by (i) linearly interpolating at least one coordinate of each pixel along said locus of pixels to obtain an interpolated coordinate, (ii) identifying the look-up table corresponding to the location of viewing from which said two dimensional polygon was projected; (iii) applying a correction factor from the set of correction factors in the selected lookup table to the interpolated coordinate to obtain a corrected coordinate for the pixel to be mapped from the two dimensional input image.

15. Apparatus according to claim 14, wherein said storage means is arranged to store a plurality of look up tables and a selector is arranged to select look up tables by processing depth (z) values.

16. Apparatus according to claim 15, wherein said selector is arranged to select two look up tables and said processor is arranged to interpolate values between values read from said look up tables.

17. Apparatus according to claim 15, wherein said selector is arranged to divide a first depth value by a second depth value to produce a table selection value.

18. Apparatus according to claim 17, wherein said selector is arranged to select two look up tables and said processor is arranged to interpolate values between values read from said look up tables.

19. Apparatus according to claim 15, wherein said selector processes depth values by calculating the logarithm of said depth values.

20. Apparatus according to claim 19, wherein said selector is arranged to select two look up tables and said processor is arranged to interpolate values between values read from said look up tables.

21. Apparatus according to claim 19, wherein said selector includes a shift register, means for shifting values in said register and processing means for processing said shifted values, to provide an indication of the required look up table.

22. Apparatus according to claim 21, wherein said selector is arranged to select two look up tables and said processor is arranged to interpolate values between values read from said look up tables.

23. Apparatus according to claim 14, wherein said selector is arranged to select two look up tables and said processor is arranged to interpolate values between values read from said look up tables.

24. An image processing apparatus according to claim 14, wherein said processing means applies a correction factor to both cartesion coordinates of each pixel of said locus of pixels.

25. An image processing apparatus according to claim 14, further comprising means for scaling the interpolated coordinate and applying the correction factor to the scaled interpolated coordinate, followed by descaling the corrected coordinate to obtain the coordinate for the pixel to be mapped from the two dimensional input image.

26. An image processing apparatus according to claim 14, wherein said boundary points are vertices of the two dimensional polygon.

\* \* \* \* \*